(12) United States Patent
Sugizaki

(10) Patent No.: US 8,327,081 B2
(45) Date of Patent: Dec. 4, 2012

(54) INFORMATION PROCESSING DEVICE AND METHOD FOR CONTROLLING THE SAME

(75) Inventor: Gou Sugizaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 12/199,444

(22) Filed: Aug. 27, 2008

(65) Prior Publication Data

US 2008/0313411 A1 Dec. 18, 2008

Related U.S. Application Data

(63) Continuation of application No. PCT/JP2006/303664, filed on Feb. 28, 2006.

(51) Int. Cl.
*G06F 12/08* (2006.01)
(52) U.S. Cl. .......... 711/146; 711/144; 711/E12.026
(58) Field of Classification Search .......... 711/146, 711/144, E12.026
See application file for complete search history.

(56) References Cited

U.S. PATENT DOCUMENTS

| | | | |
|---|---|---|---|
| 5,398,325 A | 3/1995 | Chang et al. | |
| 5,634,068 A | 5/1997 | Nishtala et al. | |
| 5,737,757 A | 4/1998 | Hassoun et al. | |
| 5,829,039 A | 10/1998 | Sugino et al. | |
| 5,890,217 A | 3/1999 | Kabemoto et al. | |
| 5,893,160 A | 4/1999 | Loewenstein et al. | |
| 6,108,765 A | 8/2000 | Caudel et al. | |
| 6,115,804 A | 9/2000 | Carpenter et al. | |
| 6,266,743 B1 | 7/2001 | Carpenter et al. | |
| 6,678,800 B1 * | 1/2004 | Kurihara et al. | 711/144 |
| 7,418,558 B2 | 8/2008 | Sugizaki | |
| 2006/0031641 A1 | 2/2006 | Hataida et al. | |
| 2006/0047918 A1 | 3/2006 | Sugizaki | |
| 2006/0090041 A1 | 4/2006 | Nakagawa | |

FOREIGN PATENT DOCUMENTS

| | | |
|---|---|---|
| EP | 0 681 240 A2 | 11/1995 |
| EP | 0 690 383 A2 | 1/1996 |
| EP | 0 735 480 A1 | 10/1996 |
| EP | 0 801 349 A1 | 10/1997 |
| EP | 1 624 377 A2 | 2/2006 |

(Continued)

OTHER PUBLICATIONS

International Search Report for PCT/JP2006/303664, mailed Sep. 12, 2006.

*Primary Examiner* — Yong Choe
(74) *Attorney, Agent, or Firm* — Fujitsu Patent Center

(57) ABSTRACT

A processor module having a cache device and a system controller having a copy TAG2 of a tag of the cache device configure a system to which a protocol representing the states of a data block of the cache device by six states, that is, an invalid state I, a shared state S, an exclusive state E, a modified state M, a shared modified state O, and a writable modified state W can be applied. In order to implement the concept, information about a new state in a cache device of a requester is included in a reply packet from the cache device for transmitting the data block. After the completion of the snooping process of the TAG2 until the reception of the reply packet from the cache device for transmitting the data block and the determination of the next state, an object data block is locked in the TAG2.

2 Claims, 9 Drawing Sheets

FOREIGN PATENT DOCUMENTS

| | | |
|---|---|---|
| GB | 2 299 187 A | 9/1996 |
| GB | 2 349 721 A | 11/2000 |
| JP | 6-131263 | 5/1994 |
| JP | 7-325760 | 12/1995 |
| JP | 8-6855 | 1/1996 |
| JP | 8-16475 | 1/1996 |
| JP | 8-320827 | 12/1996 |
| JP | 9-22383 | 1/1997 |
| JP | 9-101943 | 4/1997 |
| JP | 10-105464 | 4/1998 |
| JP | 2000-227908 | 8/2000 |
| JP | 2000-242621 | 9/2000 |
| JP | 2000-250884 | 9/2000 |
| JP | 2001-109662 | 4/2001 |
| JP | 2006-48406 | 2/2006 |
| JP | 2006-72509 | 3/2006 |
| JP | 2006-120029 | 5/2006 |
| JP | 2006-155110 | 6/2006 |

* cited by examiner

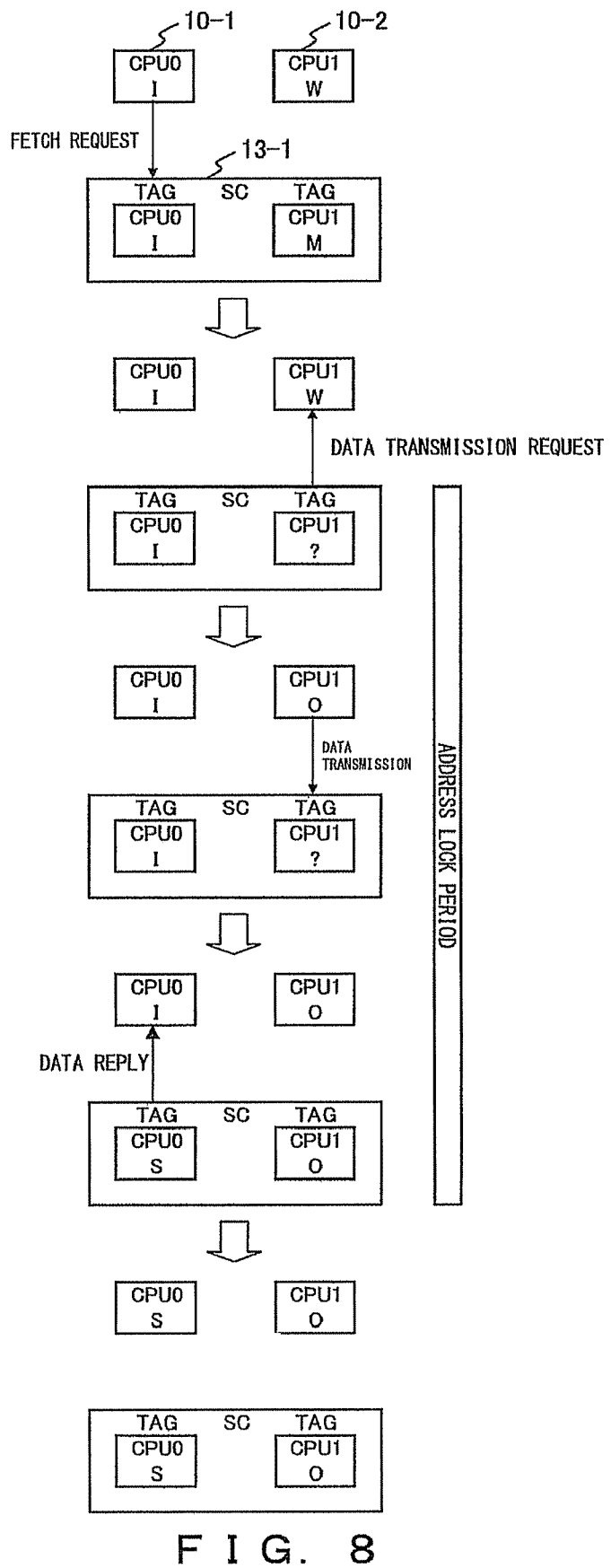
F I G. 8

INFORMATION PROCESSING DEVICE AND METHOD FOR CONTROLLING THE SAME

CROSS REFERENCE TO RELATED APPLICATION

This application is a continuation of PCT application of PCT/JP2006/303664, which was filed on Feb. 28, 2006.

BACKGROUND OF THE INVENTION

1. Field of the Invention

This specification relates to a system controller for controlling a cache device configuring a multiprocessor system and a cache control method for controlling the cache device, and may be applied to a system controller and a cache control method capable of reducing state modify requests to a data block on a cache device of another system and improving the access performance of a cache device of a related cache device.

2. Description of the Related Art

Conventionally, with an increasing number of requests for a higher speed computer system, a multiprocessor system is provided with a cache device for each CPU. The data on the cache device provided for each CPU is managed for each block on the cache device according to the rules for maintaining the consistency of data with the cache memory referred to as a cache coherence protocol to assure the correctness of data between cache devices, that is, to share data and maintain the consistency.

An MESI cache protocol for managing four states of "M", "E", "S", and "I" is well known as a conventional common cache protocol. "M" indicates a modified state in which valid data is held in only one of a plurality of cache devices, the data is modified, and it is not guaranteed that the value of the data is the same as the value in the main storage. "E" indicates an exclusive state in which valid data is held in only one of a plurality of cache devices. "S" indicates a shared state in which same data is held in a plurality of cache devices. "I" indicates an invalid state in which data on a cache device is invalid.

In the cache control using the above-mentioned MESI cache protocol, when a fetch request in which a CPU stores a data block in a cache device and another CPU refers to the data block is issued, a write of the data block to the main storage (hereinafter referred to as an MS write) is required, thereby taking longer accessing time.

Thus, the necessity of the MS write when a fetching process is performed is eliminated by adding a shared modified state O to the MESI cache protocol. The symbol "O" indicates an owner.

However, in the cache protocol having the above-mentioned five states, when a fetching process in the related system is followed by a storing process in another system, a state modify request to switch to an invalid state I is required for the other system in the shared modified state O. In this case, the state modify request to the other system requires a longer time to perform the storing process. Since the storing process is frequently performed in the related system on the data block on the cache obtained by the fetch request of the related system, thereby largely affecting the accessibility on the entire device.

Therefore, in the cache device having cache memory and a cache controller, the cache memory holds a part of data in the main storage for each block of a cache line, and also holds information about the state of the data block held in the cache line while the cache controller represents the state of the data block in six states of, for example, the invalid state I, the shared state S, the exclusive state E, the modified state M, the shared modified state O, and the writable modified state W for stepwise sharing when a fetch request is issued, thereby controlling the cache memory.

In this technique, the state of the data block to be managed on the cache device is classified, thereby reducing the number of state modify requests to another system and speeding up the access to the cache device.

However, in the above-mentioned snoop control, since there can be many cases in which the state of an object data block cannot be discriminated by a copy (hereinafter referred to as a TAG2) of a tag (TAG) of a cache memory device provided for the system controller, an error can occur in transferring a data block between cache devices.

For example, when fetch access is executed, the state at the entry in the cache memory of a requesting CPU depends on the state (exclusive state E, writable modified state W, modified state M) of a hit data block, but the discrimination cannot be performed using a tag table of the system controller. Therefore, it is necessary to know the entry state of the object data block from the hit cache memory. The system controller normally updates the tag tables of all relevant cache memory after a snooping process is completed and a data transfer request to the hit cache memory or an issue of a memory access request to the main memory is determined. However, since the state of the object data block is not determined until a reply to the data transfer request from the cache memory is received, there can be a period in which the state on the tag table is uncertain.

SUMMARY OF THE INVENTION

According to an aspect of the embodiments, the system controller controls the cache device configuring a multiprocessor system. The cache device includes: cache memory provided for each processor module, connected to each other, and holding a part of data of main storage for each block of a cache line and holding information about the state of a data block held in the cache line; and a cache controller for controlling the cache memory by representing the state of the data block by six states of an invalid state I, a shared state S, an exclusive state E, a modified state M, a shared modified state O, and a writable modified state W. The system controller includes a snoop control unit for reporting the state of the data block among the six states from a hit cache device transmitting the data block as a new state on a cache device of a data transfer destination when the next state of an object data block is not determined upon completion of a snooping process.

It is desired that the system controller has the snoop control unit receiving a data transfer reply upon completion of the snooping process and performing address locking on an object data block until the next state is determined.

It is also desired that the system controller is an LSI for a large system LSI having a plurality of cache devices.

According to another aspect of the embodiments, the cache control method is a cache control method for controlling a cache device configuring a multiprocessor system including: holding a part of data of main storage in cache memory for each block of a cache line; holding information about the state of a data block held in the cache line; representing the state of the data block by six states of an invalid state I, a shared state S, an exclusive state E, a modified state M, a shared modified state O, and a writable modified state W, thereby controlling the cache memory; and reporting the state of the data block among the six states from a hit cache device transmitting the data block as a new state on a cache device of a data transfer destination when the next state of an object data block is not determined upon completion of a snooping process.

It is desired that the cache control method according to the embodiments includes receiving a data transfer reply upon completion of the snooping process and performing address locking on an object data block until the next state is determined.

BRIEF DESCRIPTION OF THE DRAWINGS

FIG. 8 shows the state transition of a hit case in the writable modified state W.

DESCRIPTION OF THE PREFERRED EMBODIMENT

The embodiments has been developed to solve the above-mentioned problems, and aims at providing a system controller and a cache control method capable of a large information processing device configured by a multiprocessor enhancing the accessibility to a cache device of a related cache device by reducing the number of state modify requests to a data block of a cache device of another system.

The embodiments are described below with reference to the attached drawings.

Figure 1:
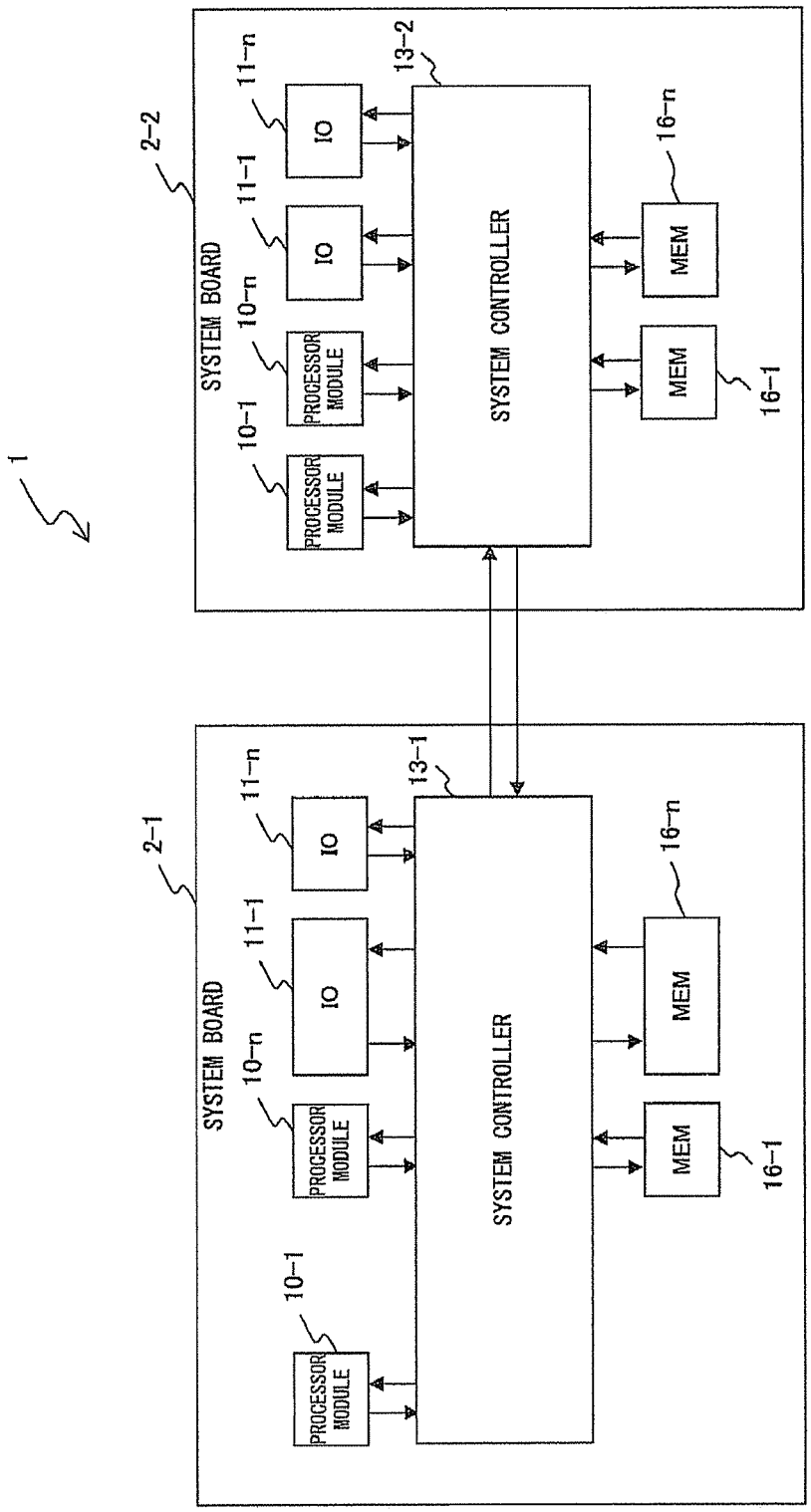
FIG. 1 is an explanatory view of the outline of a multiprocessor system.

FIG. 1 is an explanatory view of the outline of a multiprocessor system.

In FIG. 1, a multiprocessor system 1 includes a plurality of system boards 2-1 and 2-2. Each of the system boards 2-1 and 2-2 includes a system controller 13-1 or 13-2, a plurality of processor modules 10-1, . . . , 10-n, a plurality of I/O devices 11-1, . . . , 11-n, and a plurality of memory units (MEM) 16-1, . . . , 16-n. The system boards 2-1 and 2-2 are connected to be able to communicate with each other, and control a read and a write to and from the memory units 16-1, . . . , 16-n at an instruction from the processor modules 10-1, . . . , 10-n or the I/O devices 11-1, . . . , 11-n.

Figure 2:
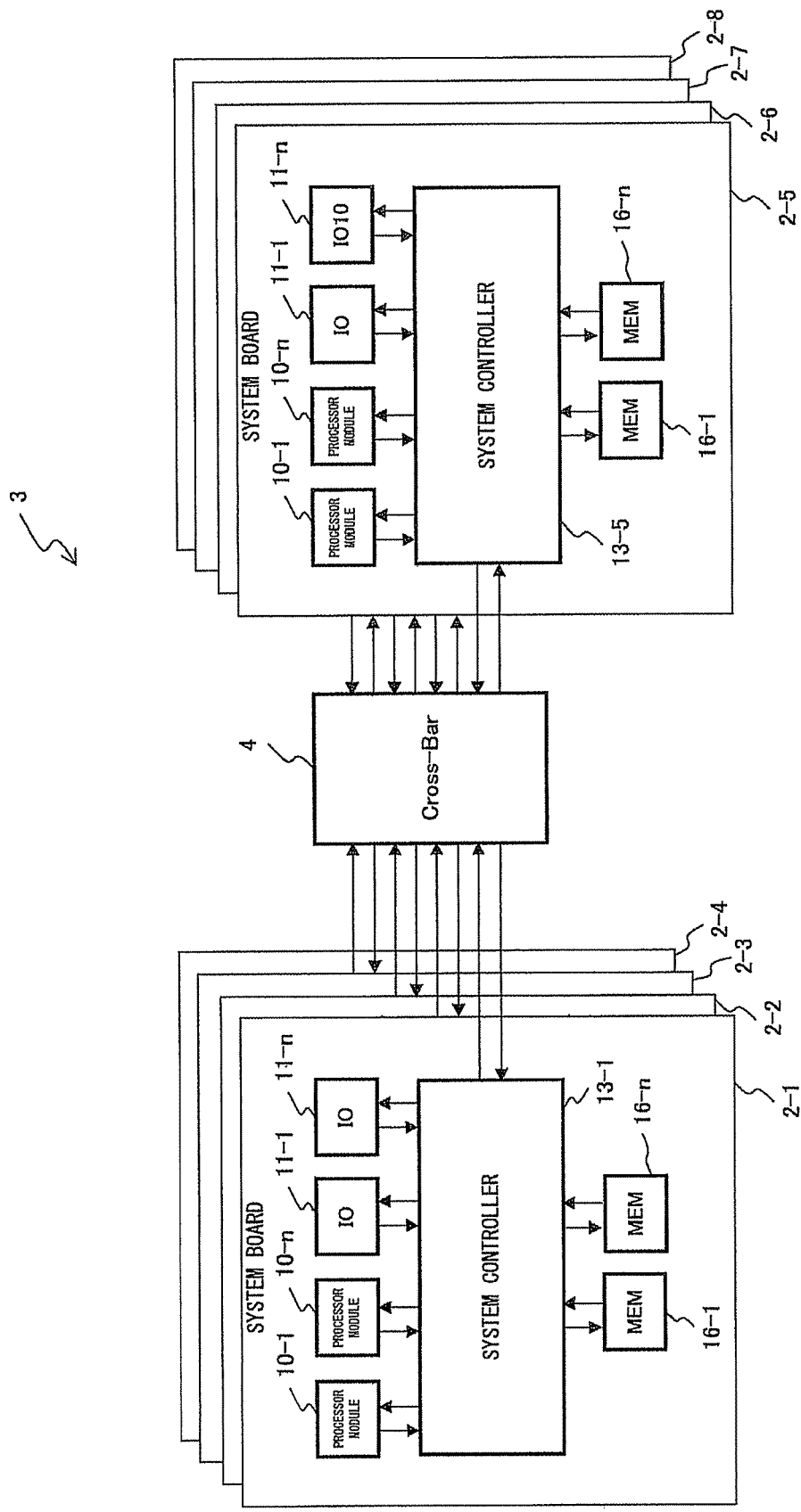
FIG. 2 is an explanatory view of the outline of a large multiprocessor system.

FIG. 2 is an explanatory view of the outline of a large multiprocessor system.

In FIG. 2, a multiprocessor systems 3 is larger than the multiprocessor system 1 shown in FIG. 1, and is provided with more system boards 2-1, 2-2, 2-3, 2-4, 2-5, 2-6, 2-7, and 2-8, and the system boards 2-1, . . . , 2-8 are interconnected to one another through a cross bar switch 4.

As with the system board 2-1 of the multiprocessor system 1 shown in FIG. 1, these system boards 2-1, . . . , 2-8 include one system controllers 13-1, . . . , 13-5, . . . , a plurality of processor modules 10-1, . . . , 10-n, a plurality of I/O devices 11-1, . . . , 11-n, and a plurality of memory units (MEM) 16-1, . . . , 16-n.

The embodiments can be applied to the multiprocessor system as shown in FIGS. 1 and 2.

Figure 3:
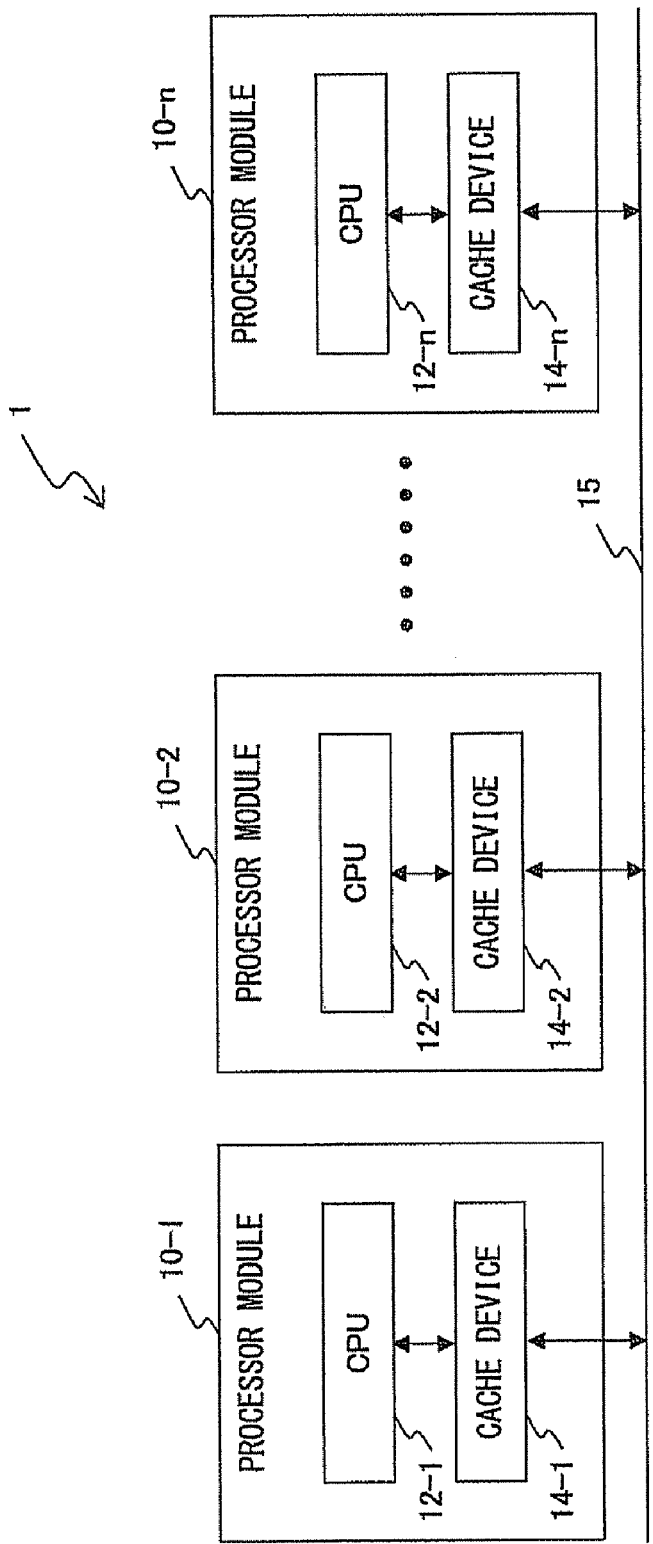
FIG. 3 is a block diagram showing the configuration of the hardware of a multiprocessor system.

FIG. 3 is a block diagram showing the configuration of the hardware of a multiprocessor system.

In FIG. 3, the multiprocessor system 1 is provided with a plurality of processor modules 10-1, 10-2, . . . , 10-n. Each of the processor modules 10-1 to 10-n is provided with CPUs (processors) 12-1 to 12-n and cache devices 14-1 to 14-n. Each of the processor modules 10-1, . . . , 10-n is interconnected to each other by connecting the cache devices 14-1 to 14-n to a system bus 15.

For example, a snoop bus can be the system bus 15 for connecting the cache devices 14-1 to 14-n. A snoop bus refers to a bus capable of immediately acquiring the state of the data block held in a cache line corresponding to the process requests when any of the cache devices 14-1 to 14-n issues a request to fetch or store data from the CPUs 12-1 to 12-n according to the state signal of the snoop control line.

Figure 4:
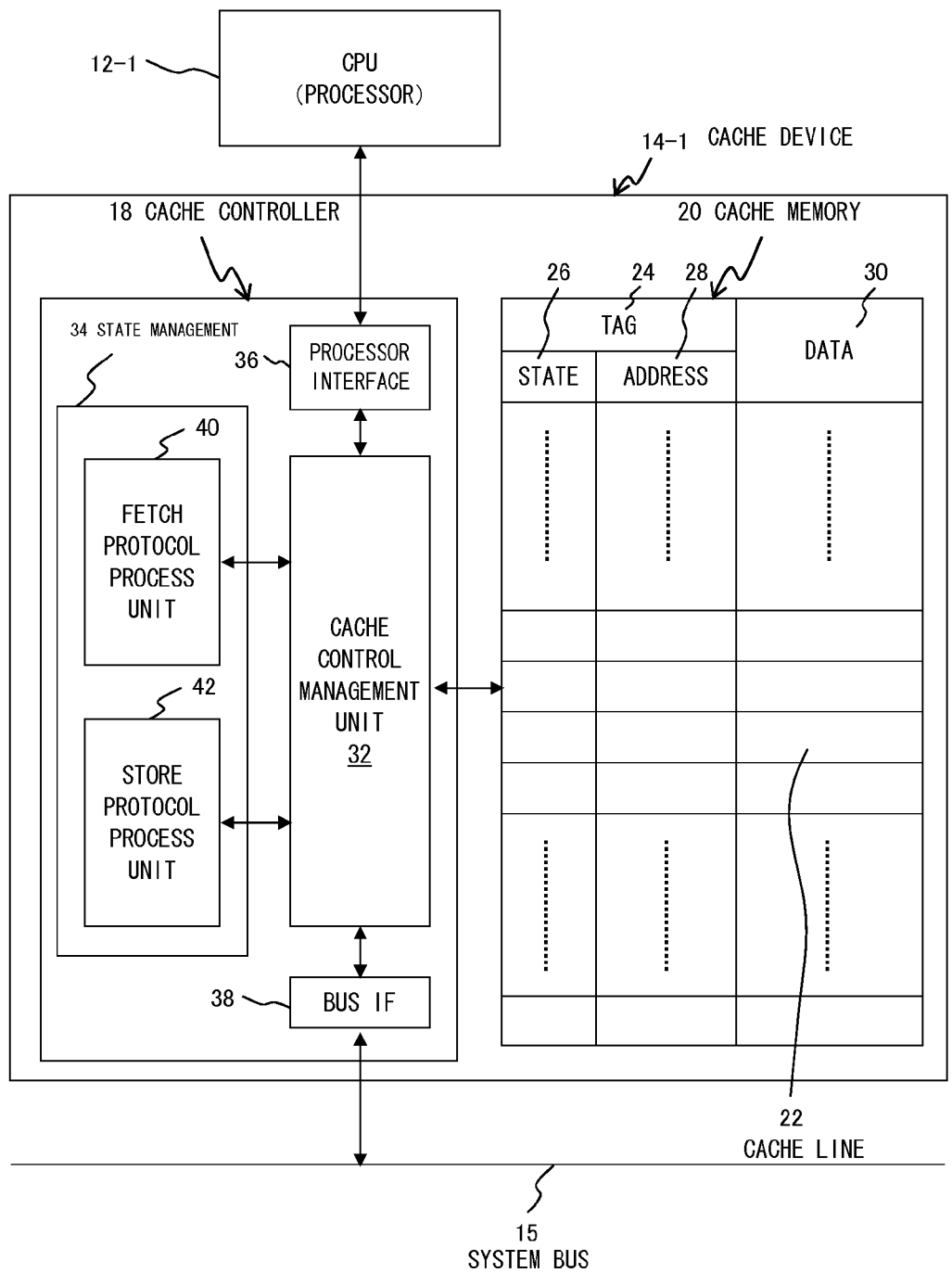
FIG. 4 is a block diagram showing the function of a cache device.

FIG. 4 is a block diagram showing the function of a cache device.

In FIG. 4, the cache device 14-1 is provided with a cache controller 18 and cache memory 20. The cache memory 20 holds data for each of a plurality of cache line 22, and each cache line 22 includes a tag 24 and a data block 30. The tag 24 is provided with a state tag 26 and an address tag 28.

The state tag 26 of the cache memory 20 has the state of a data block by six representations, that is, the invalid state I, the shared state S, the exclusive state E, the modified state M, the shared modified state O, and the writable modified state W, thereby managing the cache memory 20.

The cache controller 18 is provided with a cache control management unit 32, a state management unit 34, a processor interface (IF) 36, and a bus interface (IF) 38. The state management unit 34 is provided with a fetch protocol process unit 40 and a store protocol process unit 42.

Upon receipt of a fetch request from the CPU 12-1, the cache control management unit 32 refers to the tag 24 of the cache memory 20, and retrieves the cache line 22 having the address tag 28 matching the address value of the requested address. If there is no cache line 22 matching in address, a cache mishit occurs, the cache control management unit 32 acquires a data block from the main storage or any other cache devices 14-2 to 14-n, and provides it for the CPU 12-1.

When there is the cache line 22 having an address matching the requested address, the cache control management unit 32 performs a process depending on any of the invalid state I, the shared state S, the exclusive state E, the modified state M, the shared modified state O, and the writable modified state W by the state tag 26 of the corresponding cache line 22 on the cache memory 20.

In response to the store request from the CPU 12-1, the cache control management unit 32 performs a storing process of updating a data block of the corresponding cache line 22 on the cache memory 20 if a cache hit occurs, and reserves a new cache line 22 on the cache memory 20 and performs a storing process by writing data if a mishit occurs. If there is a data block corresponding to any of other cache devices 14-2 to 14-n, the latest data block is acquired from any of the cache devices 14-2 to 14-n, and a storing process is performed by writing data.

In response to the process request from the CPU 12-1 and any of other cache devices 14-2 to 14-n through the system bus 15 by the cache control management unit 32, the state management unit 34 controls the state transition of the state tag 26 on the corresponding cache line 22 after the execution of the process request.

As the state transition control for cache coherence by the state management unit 34, the cache protocol of the six states of the invalid state I, the shared state S, the exclusive state E, the modified state M, the shared modified state O, and the writable modified state W is applied.

Other cache devices 14-2 to 14-n have functions similar to those of the cache device 14-1.

Figure 5:
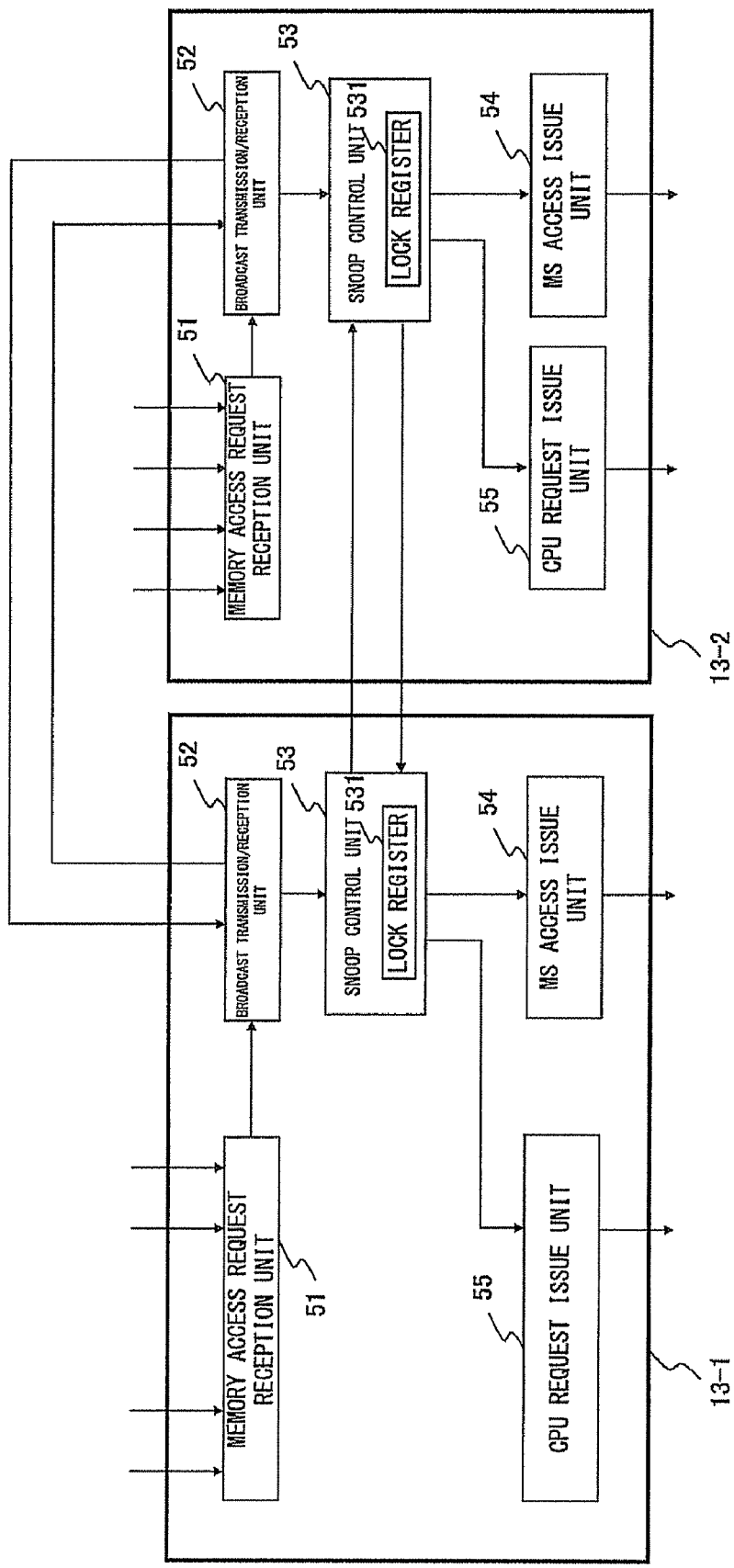
FIG. 5 is a block diagram showing the function of a system controller.

FIG. 5 is a block diagram showing the function of the system controller.

In FIG. 5, each of the system controllers 13-1 and 13-2 is provided with a memory access request reception unit 51, a broadcast transmission/reception unit 52, a snoop control unit 53, an MS access issue unit 54, and a CPU request issue unit 55.

The memory access request reception unit 51 receives an access request to the memory units 16-1, . . . , 16-2 from the processor modules 10-1, . . . , 10-n or the I/O devices 11-1, . . . , 11-n. The broadcast transmission/reception unit 52 transmits and receives an access request to and from the broadcast transmission/reception unit 52 in another system controller 13-1 or 13-2 when the access request received by the memory access request reception unit 51 of the system controller 13-1 or 13-2 is an access request to the memory units 16-1, . . . , 16-2 of the other system controller 13-1 or 13-2.

The snoop control unit 53 performs a snooping process for detecting the contents stored in the memory units 16-1, . . . , 16-2 based on the access request from the processor modules 10-1, . . . , 10-n of the I/O devices 11-1, . . . , 11-n through the broadcast transmission/reception unit 52. The snoop control unit 53 sets locking for the address of an object data block from the point when the snooping process is completed to the point when a reply to data transfer is received according to the information stored in a lock register 531.

The MS access issue unit 54 issues an access instruction to the memory units 16-1, . . . , 16-2 based on an instruction from the snoop control unit 53, and the CPU request issue unit 55 issues an access instruction to the processor modules 10-1, . . . , 10-n based on an instruction from the snoop control unit 53.

Described next is the cache control process performed in the multiprocessor system with the above-mentioned configuration.

Figure 6:
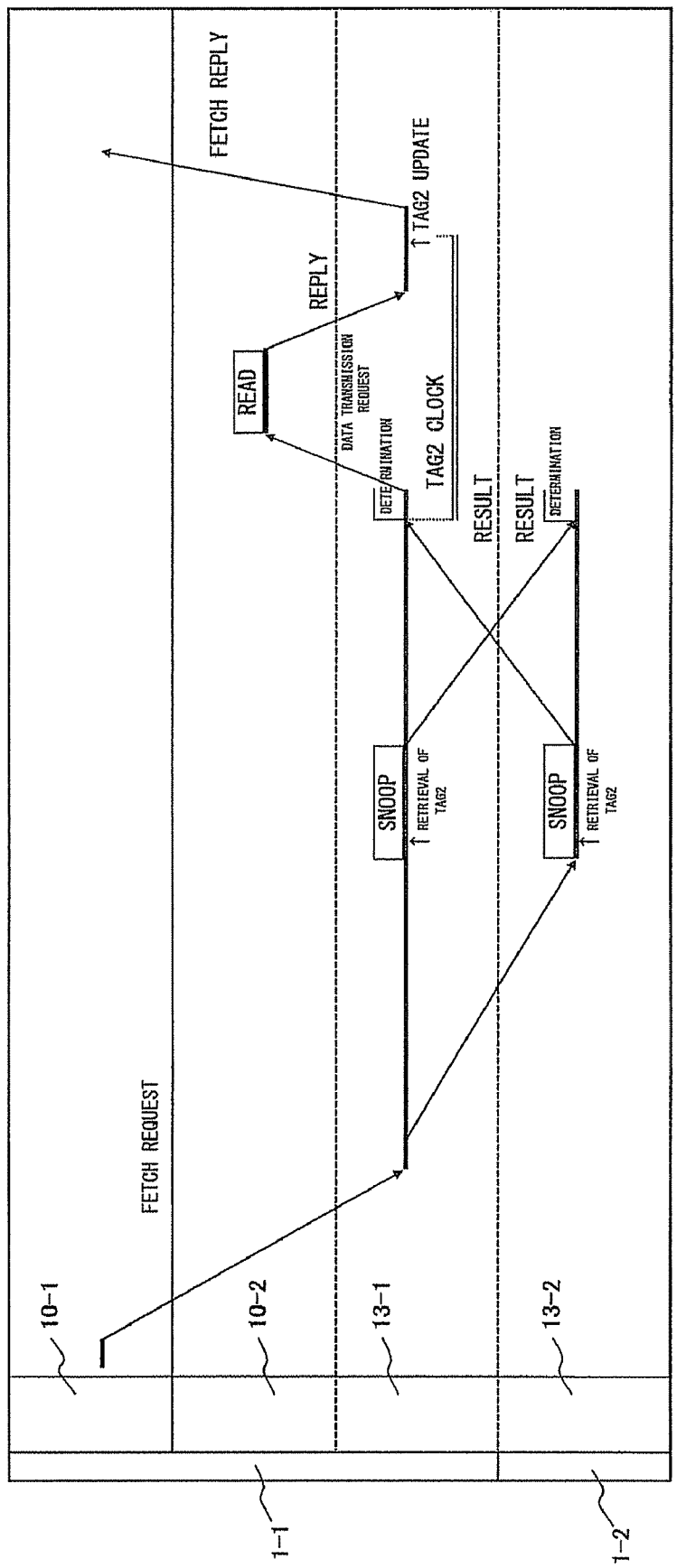
FIG. 6 shows address locking in updating a TAG2.
Figure 7:
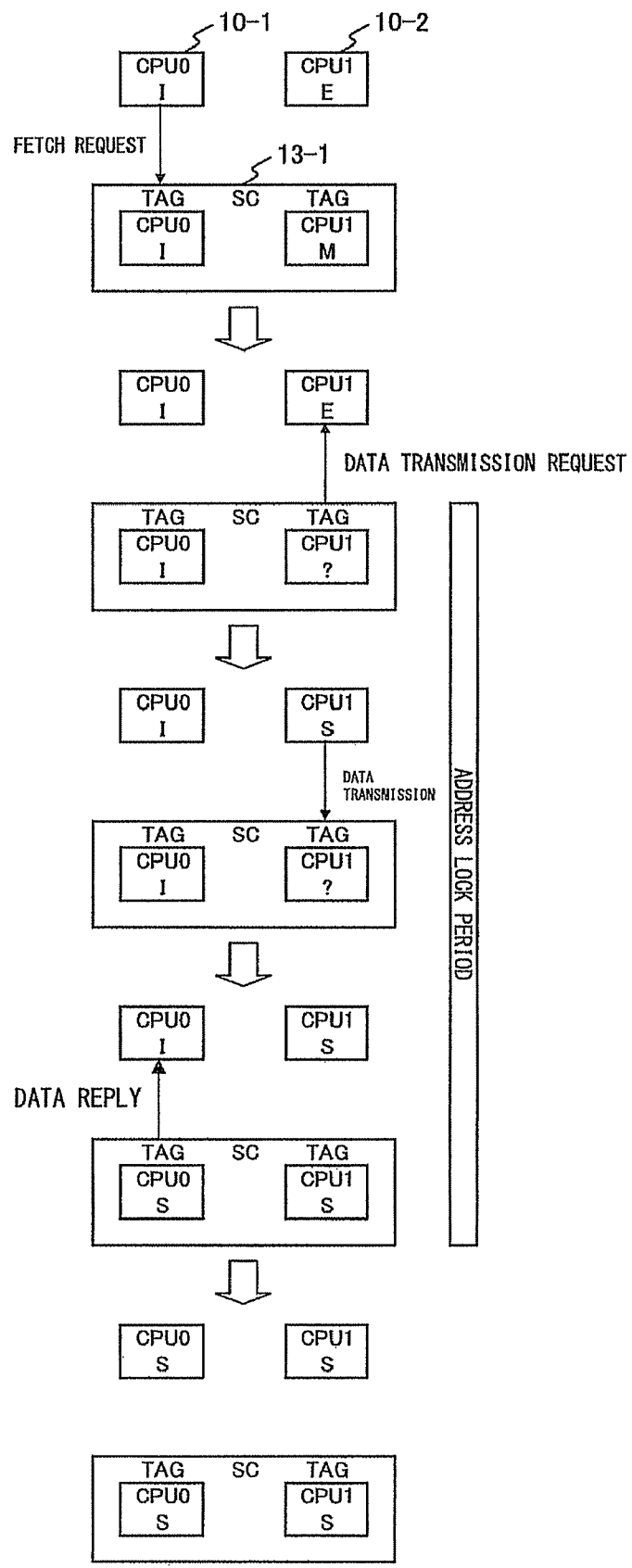
FIG. 7 shows the state transition of a hit case in the exclusive state E.
Figure 9:
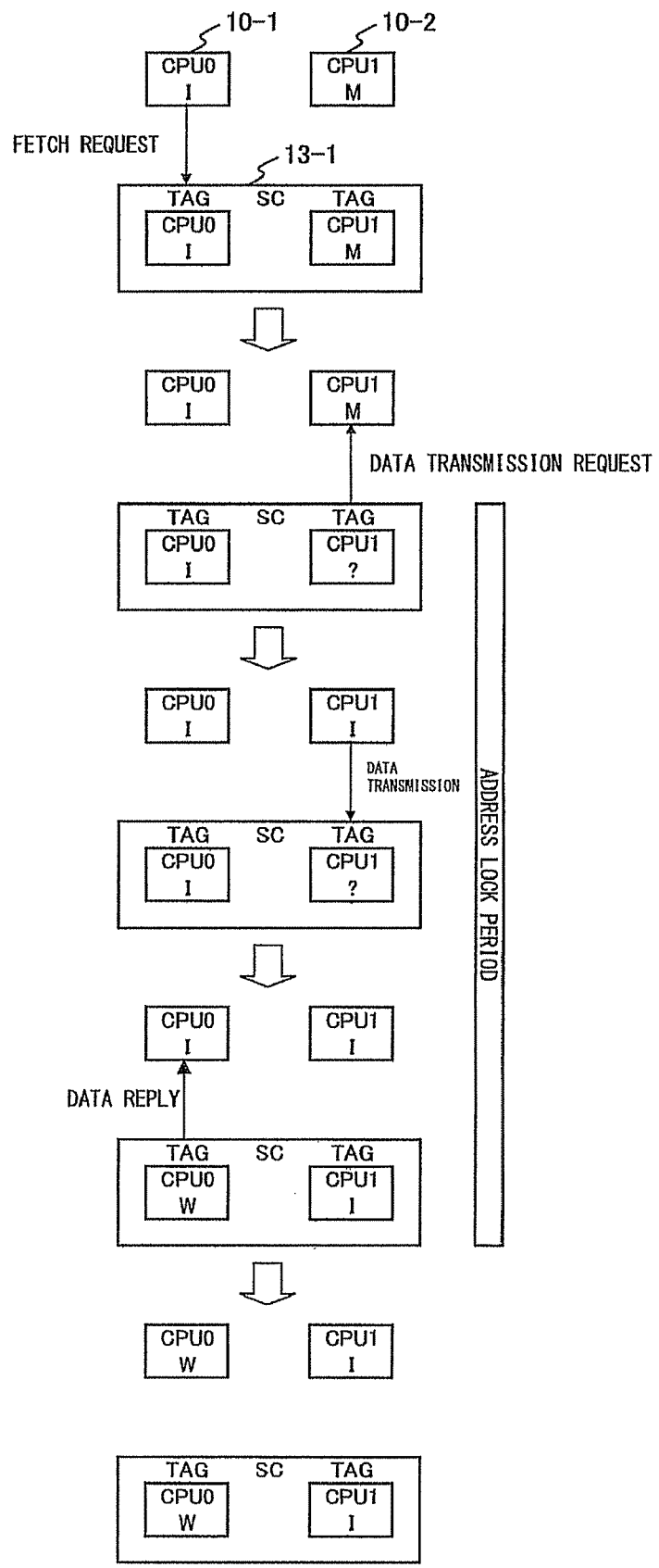
FIG. 9 shows the state transition of a hit case in the modified state M.

FIG. 6 shows address locking in updating a TAG2. FIGS. 7 through 9 show state transitions. FIG. 7 shows the state transition of a hit case in the exclusive state E. FIG. 8 shows the state transition of a hit case in the writable modified state W. FIG. 9 shows the state transition of a hit case in the modified state M.

In the embodiments, when the next state of an object data block is not determined at the completion of the snooping process, a cache protocol is configured to report the next state of the related device in the six states, that is, the invalid state I, the shared state S, the exclusive state E, the modified state M, the shared modified state O, and the writable modified state W, from the hit cache device that transmits a data block as a new state on the cache device to which data is transferred. When a TAG2 is updated on the system controller, the address lock control is performed on an object data block after receiving a data transfer reply at the completion of the snooping process until the next state is determined, and the lock control is performed to inhibit access to the same subsequent data block.

That is, relating to the above-mentioned cache protocol, when data is to be transferred by a fetch request between cache devices, a hit cache device (source of data transfer) notifies a system controller of a new state together with a data transfer reply depending on the entry state of an object data block. The CPU as a fetch requester makes a new entry in the cache device in the "requester" state of the information in a reply packet of the data transfer. The CPU of the data transfer source changes the entry state of the object data block into the "transfer source" state when the data is transferred.

Relating to the lock control relating to the update of the TAG2, when the fetch request makes a hit in the exclusive state E, the modified state M, or the writable modified state W in the cache device of another CPU (the state is all exclusive state E for the TAG2 of the system controller), a data transfer is requested to the hit cache device, and from the point when the snoop is completed to the point when the data transfer reply is received, a lock is set for the address of the object data block. Then, until the update of the TAG2 of the system controller is completed by the data transfer, another access to the same data block cannot be performed.

Thus, the control of the 6-state cache protocol to enhance the accessibility to a cache device by reducing the number of state modify requests to a data block on another cache device can be requested address in the conventional snooping system.

The embodiments are described above with reference to the attached drawings, but the above-mentioned embodiments can be realized by hardware as a function of a system controller, firmware by a DSP board and a CPU board, or software.

It is obvious that the system controller according to the embodiments is not limited to the above-mentioned embodiments so far as the function can be realized, that is, it can be a single device, a system or an integrated device including a plurality of devices, or a system for performing a process over a network such as a LAN, a WAN, etc.

It also can be realized by a system configured by a CPU, memory such as ROM and RAM, an input device, an output device, an external storage device, a medium drive device, and a network connection device interconnected via a bus. That is, the memory such as ROM and RAM, the external storage device, and the portable recording medium recording a program code of the software for realizing the system according to the embodiments described above can be supplied to a system controller, and the computer of the system controller can read the program code, thereby realizing the embodiments.

In this case, the program code itself read from the portable recording medium etc. realizes the new function of the embodiments, and the portable recording medium etc. recording the program code configures the embodiments.

The portable recording medium for supplying the program code can be, for example, a flexible disk, a hard disk, an optical disk, a magneto optical disk, CD-ROM, CD-R, DVD-ROM, DVD-RAM, a magnetic tape, a non-volatile memory card, a ROM card, various recording media recording data through a network connection device (that is, a communication line) for e-mail, a personal computer communication, etc.

By the computer (information processing device) executing the program code read to the memory, the functions of the above-mentioned embodiments are realized, and the OS etc. operating on a computer performs all or a part of the actual process according to an instruction of the program code, thereby realizing the function of the above-mentioned embodiments.

The functions of the above-mentioned embodiments can also be realized by performing the process of writing a program code read from a portable recording medium and a program (data) provided by a program (data) provider to memory of a feature expansion board inserted into the computer or a feature expansion unit connected to the computer, and then performing all or a part of the actual process by the CPU of the feature expansion board or the feature expansion unit based on the instruction of the program code.

That is, the embodiments is not limited to the above-mentioned embodiments, but can be of various configurations or shapes within the scope of the gist of the embodiments.

What is claimed is:

1. An information processing apparatus including a system controller and a main memory and a plurality of processors connected each other and connected to the main memory via the system controller, the processor comprising:
   a cache memory that holds a part of data stored in the main memory for each data block of a cache line, and that holds cache state information indicating each state of each data block held in the cache line; and
   a cache controller that controls the cache memory by using the state of the data block by six states of an invalid state, a shared state, an exclusive state, a modified state, a shared modified state, and a writable modified state, wherein
   the system controller comprises
      a snoop control unit that receives a data transfer reply upon completion of a snooping process by the system controller, performs address locking on an object data block until the next state is determined, receives an object data block causing a cache hit and cache state information indicating a new state of a data block replaced by the object data block in a cache memory included in a processor of a data transfer destination from a processor transmitting the object data block when the next state of the replaced data block is not determined upon completion of the snooping process by the system controller, and changes a state of the replaced data block into the new state by using the received cache state information.

2. A control method of an information processing apparatus including a system controller and a main memory and a plurality of processors connected each other and connected to the main memory via the system controller and each of the plurality of processors includes a cache memory that holds a part of data stored in the main memory for each data block of a cache line, and that holds cache state information indicating each state of each data block held in the cache line, and a cache controller that controls the cache memory by using the state of the data block by six states of an invalid state, a shared state, an exclusive state, a modified state, a shared modified state, and a writable modified state, the control method comprising:
   executing a snooping process by the system controller;
   receiving a data transfer reply by the system controller upon completion of a snooping process;
   performing address locking on an object data block by the system controller until the next state is determined; and
   receiving an object data block causing a cache hit and cache state information indicating a new state of a data block replaced by the object data block in a cache memory included in a processor of a data transfer destination from a processor transmitting the object data block by the system controller when the next state of the replaced data block is not determined upon completion of the snooping process by the system controller, and changes a state of the replaced data block into the new state by using the received cache state information.

* * * * *